Jan. 4, 1955     E. F. AHLSTROM     2,698,702
PELLET PULVERIZER
Filed April 9, 1951

INVENTOR.
Edward F. Ahlstrom
BY
ATTORNEY.

United States Patent Office 2,698,702
Patented Jan. 4, 1955

2,698,702

PELLET PULVERIZER

Edward F. Ahlstrom, Kansas City, Mo., assignor to Chef-Way, Inc., Kansas City, Mo., a corporation of Missouri Application April 9, 1951, Serial No. 220,007

3 Claims. (Cl. 222—145)

This invention has to do with apparatus for pulverizing pelletted products and simultaneously admixing a liquid therewith with sufficient thoroughness as to place the ingredients in solution, thereby avoiding subsequent separation.

More specifically the invention hereof relates to a pulverizer that is particularly adapted for use with machines for producing a drink wherein the ingredients of the drink comprise a pulverized pellet or a number of differing pellets, together with a hot liquid such as water all thoroughly admixed prior to vending into a suitable container.

Accordingly, it is the primary object of the present invention to provide a pulverizer; means for directing the liquid to the pulverizing elements thereof simultaneously with the passage of the pellets thereto in such manner as to assure proper admixture and/or homogenization; to maintain the interior of the pulverizer body, as well as the various passageways forming a part thereof, clean and fully sanitary; and to avoid back flow or reverse movement of the materials toward the feeding end of the pulverizer during the operation thereof.

It is the most important object of this invention to provide a pellet pulverizer having feeding means that includes a tubular inlet that is provided with an internal annular groove for receiving a liquid through the medium of a tangentially disposed inlet port communicating with the groove, all to the end that the liquid circumscribes the path of travel of the pellets into the apparatus.

Another object of this invention is the provision of a pulverizer having an inlet tube as just above mentioned, together with a tubular sleeve telescoped coaxially in the tube with the annular groove circumscribing the sleeve for the purpose of directing the liquid to the pulverizing means in sheet form and along a spiral path of travel.

Other objects include the way in which the aforesaid sleeve is arranged to communicate with a hopper and to maintain the latter out of direct communication with the liquid-receiving groove; the way in which the elements thus far set forth operate to prevent deleterious effect of the tendency to back-flow during the pulverizing and admixing operation; the way in which the details of construction render the feeding assembly easily cleaned and/or repaired; and many other more minor objects, all of which will be made clear or become apparent as the following specification progresses, reference being had to the accompanying drawing, wherein:

Figure 1:
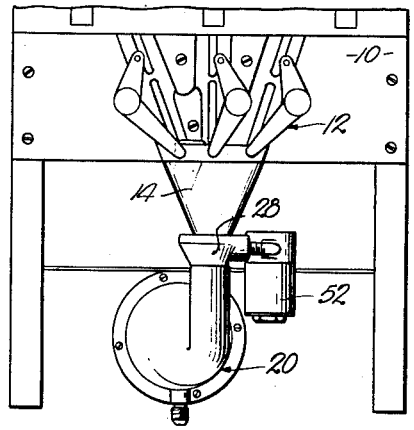
Figure 1 is a front elevational view of a pellet pulverizer made pursuant to the present invention showing its contemplated disposition with respect to a drink vending machine with which the same is to be used.

In Figure 1 of the drawing, the pulverizer about to be described is illustrated associated with a drink vending machine broadly designated by the numeral 10 and including mechanism 12 for controlling gravitation of pellets into a hopper 14. By way of explanation, it is anticipated that the machine 10 be provided with coin-control mechanism and that upon deposit of a predetermined number of coins, the potential customer may select the drink desired. For instance, through manual actuation of designated controls, the customer may either obtain black coffee, coffee with cream, coffee with sugar or coffee with sugar and cream. The parts of mechanism 12 therefore, will all operate simultaneously or separately depending upon the desire of the purchaser. Such selection will also place in operation an electric motor or other prime mover 16 just prior to release of a pellet or pellets into hopper 14 to drive a rotor 18 disposed within a hollow body broadly designated by the numeral 20 and forming a part of the pulverizer hereof.

The precise formation and operation of the pulverizing means including rotor 18, forms no part of the present invention and it is suffice to point out that the same is capable of producing a drink wherein the ingredients including the pulverized pellets and a liquid, are thoroughly and completely admixed and virtually homogenized. The form and design of the rotor 18, as well as of the body 20, cooperate to produce such result.

It is noted that body 20 is provided with an outlet opening 22 for the admixed ingredients, together with an elongated tube 24 for receiving the pellets from hopper 14 as well as the liquid to be admixed therewith during the pulverizing operation. Tube 24 terminates in an elongated, cylindrical portion 26 having its axis vertical and provided with an open uppermost end that communicates directly with the hopper 14. The inlet tube 24 is for the most part integral with the body 20 but the portion 26 thereof includes a section 28 having a portion 30 of reduced external diameter telescoped within that part of the cylindrical portion 26 that is integral with body 20.

Figure 3:
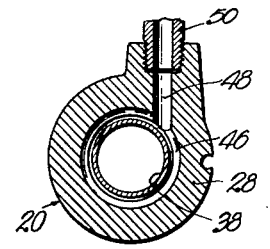
Fig. 3 is a detailed, cross-sectional view taken on line III—III of Fig. 2.
Figures 2, 4:
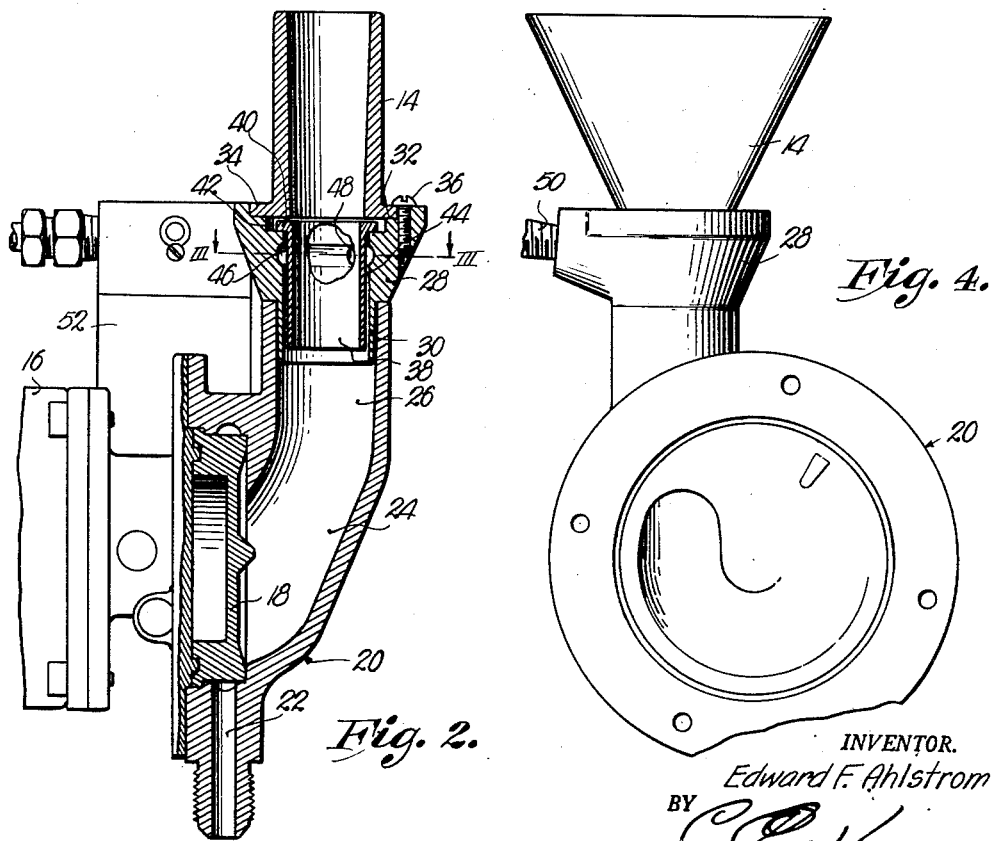
Fig. 2 is an enlarged, side elevational view of the pulverizer partially in section to reveal details of construction.
Fig. 4 is a rear elevational view of the pulverizer with its prime mover, rotor and a section of the body thereof removed.

Section 28 of tube 24 is provided with a cavity 32 at its uppermost end for receiving out-turned, annular flange 34 of hopper 14 and fastening means 36 provided in the section 28 serve to releasably secure hopper 14 to the section 28. An elongated, cylindrical sleeve 38 is telescoped coaxially within the tube section 28 and is removably held in place through the medium of an annular external flange 40 on the uppermost end of sleeve 38 that extends into an annular cavity 42 formed in the section 28 and having a diameter less than the diameter of cavity 32. It is seen that the over-all length of the sleeve 38 is less than the length of the section 28 and that the outside diameter of sleeve 38 is less than the inside diameter of section 28 presenting an elongated, relatively narrow, annular chamber 44 between sleeve 38 and the tubular section 28. Section 28 of tube 24 has an annular, internal groove 46 formed therein immediately below the cavity 42 thereof that circumscribes the sleeve 38 and is in registering relationship with the annular chamber 44. Groove 46 is preferably semi-circular in cross-section and is adapted to receive hot water or other liquid through the medium of an inlet port 48 that communicates directly with groove 46 and is disposed tangentially thereto as illustrated in Fig. 3 of the drawing.

The inlet port 48 of section 28 receives a conduit 50 that communicates with a suitable source of hot water (not shown) and a solenoid valve 52 is interposed within the conduit 50 for controlling the flow of the hot liquid to the body 20.

As above indicated, the motor 16 is energized to rotate rotor 18 prior to gravitation of pellets into body 20 from hopper 14 and prior to opening of the valve 52 to admit the hot liquid. Such hot liquid is directed into the groove 46 by way of inlet port 48 under pressure and obviously, a whirling motion of the liquid will take place around the sleeve 38 and within the chamber 44 as such liquid moves downwardly from groove 46 to the body 20. By virtue of the out-turned flange 40 on the sleeve 38, such liquid cannot move upwardly and effect the free downward passage of the pellets from the hopper 14 through the sleeve 38 and into the body 20. It is seen that the inside diameter of the hopper 14 adjacent the uppermost end of sleeve 38 is substantially the same as the inside diameter of sleeve 38 and such diameters are sufficiently large to receive and pass the pellets that are discharged by mechanism 12. The liquid that emanates from the lowermost end of the annular chamber 44, circumscribes the pellets as the latter are discharged from sleeve 38 and the admixing commences immediately. Such liquid not only moves into the body 20 in an annular sheet but tends to move downwardly in a spiral path of travel by virtue of the whirling effect that takes place through the tangential disposition of the inlet port 48 and the presence of annular groove 46.

In addition to the immediate treatment of the pellets with the liquid and therefore, commencement of admixture the moment the pellets strike the rotor 18, the arrangement of parts above described is advantageous from the standpoint of preventing collection of moisture within the hopper 14 and otherwise impeding the free downward movement of the pellets from mechanism 12. The force of the liquid emanating from the lower end of chamber 44, maintains the ingredients being mixed within chamber 20 below the hopper 14 and virtually below the lowermost end of the sleeve 38. It is thus seen further that such liquid cleanses the interior of tube 24 during each operation and from the standpoint of sanitation, maintenance of the entire device in a clean condition including hopper 14, sleeve 38, body 20 and tube 24, is highly advantageous.

It is a simple matter to remove the sleeve 38 when desired by merely removing elements 36, whereupon the device may be more thoroughly cleansed from time to time if such should become necessary and to replace sleeve 38 or make other repairs. However, such maintenance is a negligible factor and the entire device needs little operator attention over long continued use.

Having thus described the invention, what is claimed as new and desired to be secured by Letters Patent is:

1. Feeding structure comprising a tube having an elongated, cylindrical portion, said portion having a vertical axis and being provided with an open uppermost end; an elongated, cylindrical sleeve coaxially telescoped within said portion of the tube adjacent said open end, the outside diameter of the sleeve throughout the length thereof being less than the inside diameter of said portion of the tube, said sleeve having a pair of opposed, open ends and being otherwise imperforate; a pellet-receiving hopper in register with said sleeve; an annular, internal groove formed in the tube and circumscribing the sleeve adjacent the uppermost end thereof in register with the space between the tube and the sleeve; and a liquid inlet port formed in the tube in register with the groove and disposed at a tangent thereto.

2. Apparatus for simultaneously feeding pellets and a liquid, said apparatus comprising structure having a vertical passage provided with an open uppermost inlet end for receiving pellets and an open lowermost outlet end, there being an internal annular groove and an internal annular cavity in said structure communicating with the passage, an elongated sleeve telescoped in said passage in coaxial alignment therewith between the inlet and the outlet, said groove surrounding the sleeve below the cavity, the outside diameter of the sleeve being less than the diameter of the passage below the groove, presenting a liquid-receiving chamber around the sleeve below the groove, there being a liquid inlet port disposed in said structure in communication with said groove for directing liquid into the groove for discharge into the chamber; and an outturned flange on the sleeve, said flange extending into the cavity to support the sleeve and to deflect said liquid downwardly toward the lowermost end of the sleeve.

3. Apparatus as set forth in claim 2 wherein the diameter of the cavity is greater than the outside diameter of the flange and the height of the cavity is greater than the thickness of the flange to provide limited movement of the sleeve in the passage.

References Cited in the file of this patent

UNITED STATES PATENTS

| Number | Name | Date |
|---|---|---|
| 248,528 | Taggart | Oct. 18, 1881 |
| 251,803 | Starkey | Jan. 3, 1882 |
| 283,830 | Taggart | Aug. 28, 1883 |
| 405,281 | Taggart | June 18, 1889 |
| 1,020,743 | Burlingham | Mar. 19, 1912 |
| 1,752,902 | Farner | Apr. 1, 1930 |
| 2,512,107 | Lenhart | June 20, 1950 |
| 2,564,983 | Lenhart | Aug. 21, 1951 |

FOREIGN PATENTS

| 10,522 | Great Britain | of 1914 |